Patented May 5, 1936

2,039,306

UNITED STATES PATENT OFFICE 2,039,306

MANUFACTURE AND TREATMENT OF ARTIFICIAL SILK AND THE LIKE

Henry Dreyfus, London, England

No Drawing. Application August 22, 1932, Serial No. 629,901. In Great Britain September 18, 1931

14 Claims. (Cl. 18—54)

This invention is a continuation in part of U. S. application S. No. 473,781 filed August 17, 1930 and relates to the production and treatment of artificial filaments, threads, yarns, ribbons, films, fabrics and the like, more particularly for the purpose of obtaining products having a reduced, subdued or modified lustre.

U. S. application S. No. 403,137 describes the manufacture of artificial filaments, threads, yarns, ribbons, films and the like having a reduced, subdued or modified lustre by distributing in the filaments or other products fine particles of white or substantially white organic substances which do not melt below about 200° C. Specifically, the method of incorporation consists in distributing the fine particles of the organic substance in the spinning solution, and spinning by dry or wet spinning methods. It is stated in the said application that the best results are achieved with organic substances of very high melting point, for example having a melting point above 240–260° C., or even above 290–300° C., and further that it is preferable that the substances used shall be insoluble in water and in dilute acids or alkalies or other reagents with which the materials are liable to be treated in commercial practice, and shall be insoluble in the common organic solvents.

U. S. application S. No. 473,781 instances as examples of suitable substances the acidyl, and particularly the diacidyl, derivatives of benzidine and like diamino bases, e. g. diacetyl benzidine, dibenzoyl benzidine and diacetyl tolidine; symmetrical-α-dinaphthyl urea, the condensation products of urea or thiourea and diphenyl bases, for example thiocarbo benzidine, carbo benzidine, 4.4'-diureido diphenyl, 4.4'-dithioureido-diphenyl and their derivatives, for example diphenyl diureido-diphenyl and also β-tetranaphthyl urea, β-dinaphthyl-oxamide, succinic α-naphthalide, para-nitro-phenylphtalimide, anthraquinone, 2.6-dichloranthraquinone or other derivatives of anthaquinone having a high melting point and acenaphthene-quinone. It is further stated that substances of somewhat lower melting point than the above bodies may be used, for example anthracene, carbazole, symmetrical-α-dinaphthyl urea, and diphenyl oxamide.

The present invention envisages broadly the treatment of artificial filaments and other products so as to form therein white or substantially white organic substances which will delustre the same and which do not melt at temperatures below about 200° C. Of particular value are the acidyl and especially the diacidyl derivatives of benzidine and like diamino bases.

In working according to the present invention either reagent or any of the reagents for forming the desired substance within the filaments may be incorporated in the filaments, and subsequently the filaments or other products may be treated with a second or further reagent in order to produce the desired substance. The initial incorporation of the first reagent may be achieved by any suitable methods, for example such a reagent may be incorporated in the spinning solution used in the manufacture of the filaments or other products by dry or wet spinning methods, or the filaments or other products may be caused to absorb the said reagent.

It is in this latter method of incorporating the first reagent that the present invention presents many advantages, since a large number of the substances which are of value according to U. S. application S. No. 403,137 may be manufactured from bases which, as is well known, have a high substantive affinity for cellulose acetate and other organic derivatives of cellulose with which the present invention is particularly concerned. Thus for instance when working according to the invention the filaments, films, fabrics or the like may be caused to absorb benzidine or other diamino base or other base substantively from solution or from a dispersion and particularly an aqueous solution or dispersion. Inasmuch as benzidine itself and a number of similar bases are insoluble in water, they may be converted to the requisite degree of solubility or dispersibility by conversion into salts, as for example the hydro-chloride, or with the aid of suitable dispersing agents, as for example Turkey red oil or other dispersing agents mentioned in U. S. Patent No. 1,618,413, the naphthenic acids, sulphonated naphthalene compounds or other dispersing agents of U. S. Patent No. 1,618,414, the resin soaps of U. S. Patent No. 1,716,721, the sulpho-aromatic fatty acids of U. S. Patent No. 1,694,413 including the sulpho-aromatic ricinoleic acids of U. S. Patent No. 1,840,572 and sulphite cellulose waste liquor or suitable mixtures of any such dispersing agents. Such dispersing agents may be used with or without auxiliary solvents adapted to increase their dispersing action, as for example the auxiliary solvents of U. S. Patents Nos. 1,690,481 and 1,803,008.

Benzidine and a large number of other bases are easily soluble in acetone and similar solvents used for the manufacture of filaments of organic derivatives of cellulose and also of nitrocellulose by dry or wet spinning processes, so that direct solution of the base in the spinning solution is readily achieved. In the case of wet spinning the coagulating bath should be chosen so that the base or other reagent for forming the final delustring product is substantially insoluble therein. Thus, for example, in the case of using bases in the spinning solution it is desirable not to include in the coagulating bath, if the latter be aqueous, an acid which will form with the base a salt which is soluble in aqueous liquors. However, if desired the second reagent for forming the delustring compound may itself be incorporated in the coagulating bath so as to form directly in the freshly spun filaments the desired delustring compound.

The second reagent for forming the desired delustring compound within the filaments may be applied to the materials at any suitable stage in their manufacture. In the case of causing filaments, yarns or fabrics to absorb the first reagent as already described, the second reagent may be applied immediately afterwards or at any suitable later stage. In the case of incorporating the first reagent in the filaments by way of the spinning solution the second reagent may be applied to the formed filaments continuously with their production either by dry or wet spinning methods, or may be applied at a later stage, as for example after the filaments have been associated or twisted into yarns or after the yarns have been woven or knitted into fabrics. A very suitable second reagent for forming the delustring compounds within the filaments continuously with their production is acetic anhydride, used for example in conjunction with benzidine and like diamino-diphenyl bases already incorporated in the filaments, since acetic anhydride is capable of reacting with the said bases at ordinary temperatures to produce the desired diacetyl derivative.

Local application, for example, by printing or stencilling methods, of either the first reagent or the second reagent or both may be employed to produce local lustre effects.

The conditions of treatment in order to bring about the reaction of the reagents within the materials to produce the delustring compound may be adjusted in accordance with the type of filament or product which is being treated. In all cases it is desirable to use reagents which require ordinary or only moderately high temperatures for reaction. For example, as already stated, benzidine and like bases react with acetic anhydride and other anhydrides to produce diacetyl benzidine and similar compounds in the cold or with only slight warming, and the reaction between benzidine and similar bases and benzoyl chloride in order to produce dibenzoyl benzidine and similar compounds can be very satisfactorily effected at temperatures of 40-60° C. Such temperatures do not harm the filaments in any way. Again, benzoic anhydride may be brought to reaction with benzidine at temperatures of the order of 90° C. On the whole it is preferable to effect the reaction at a temperature of under 150° C., and preferably temperatures of the order of 100° C. or less. The second reagent may if desired be applied in the form of vapour.

In carrying out the reaction within the materials it is obviously of importance to avoid the use of media which at the temperatures involved dissolve or unduly affect the substance of the filaments or other products. Thus for instance in effecting a reaction between benzidine and benzoyl chloride in presence of pyridine or like base adapted to combine with the hydrochloric acid eliminated, it is desirable to dilute the pyridine sufficiently to avoid any deleterious solvent action upon the cellulose acetate or like filaments. Such dilution may conveniently be carried out with benzene, toluene, xylene, and like hydrocarbons which have no substantial action upon the cellulose acetate or like filaments at the temperatures involved.

The invention is of the greatest value in its application to the manufacture and treatment of artificial filaments and other materials made of or containing cellulose aceate and other organic derivatives of cellulose, as for example cellulose formate, cellulose propionate, cellulose butyrate, cellulose nitro-acetate and the like, and also cellulose nitrate, cellulose ethers, as for instance methyl, ethyl or benzyl cellulose, and cellulose ether-esters. As in U. S. application S. No. 403,137, however, it may also be applied to the manufacture of filaments or other products having a reduced lustre from viscose and cuprammonium and like aqueous spinning solutions. The amount of organic substance incorporated in the materials will of course depend upon the degree of delustring desired, but in general proportions of ½–1 or 2% of the weight of the organic derivative of cellulose or other base are suitable, though larger proportions of 5–10% or even more may be used.

The cellulosic type of artificial silk produced from such solutions may be treated for the production therein of the desired delustring compounds substantially as described above with reference to cellulose acetate. It will, however, be noted that benzidine and similar base have but little substantive affinity for the fibre, so that in this case it is desirable to impregnate the fibre with the benzidine or a compound thereof, as for instance a salt, and to apply the second reagent under such conditions that little or no solution or elimination of the benzidine or like base from the fibre or material takes place. This may be achieved quite readily by applying the second reagent by spraying methods, printing methods or padding methods or in the form of vapour. In the case of incorporating the benzidine or other base or other reagent in the material by way of the aqueous spinning solution, solution or dispersion methods may be used as before. The benzidine and similar bases are insoluble in water, and may be incorporated in the aqueous spinning solutions either in the form of water-soluble salts or other compounds, or by the dispersion methods already indicated above in relation to securing substantive absorption of benzidine and like bases into already formed cellulose acetate filaments and other products.

The following examples are given to illustrate the invention, but it is to be understood that they do not limit it in any way.

*Example 1*

A 25% solution of cellulose acetate in 95% acetone, containing about 1% of benzidine based on the weight of the cellulose acetate, is extruded through suitable orifices into an evaporative medium according to the ordinary dry spinning process. The formed filaments are passed continuously with their production through a solution of acetic anhydride in benzene maintained at a temperature of 20-40° C. and are then dried and wound.

If desired the process may be carried out discontinuously by taking up the filaments containing the benzidine on a suitable package and subsequently passing them through a bath containing acetic anhydride or by immersing them therein.

*Example 2*

A cellulose acetate fabric is immersed in an alcoholic solution of benzidine for from ½ hr.–2 hrs. and is then centrifuged and treated with a mixture of toluene and benzoyl chloride containing pyridine in excess of the benzoyl chloride present. When the desired degree of delustring has been attained the fabric is removed, centrifuged, washed and dried.

It is desirable that the reagents used, and particularly the benzidine and pyridine, should be purified, for example as described in U. S. application S. No. 552,421 filed 22nd July, 1931.

What I claim and desire to secure by Letters Patent is:—

1. Process for the manufacture of artificial filaments, threads, yarns, ribbons, films, fabrics and the like having a reduced, subdued or modified lustre and containing an organic derivative of cellulose, which comprises forming in the materials an acidyl derivative of a diamino diphenyl base, which derivative has a melting point of at least about 200° C.

2. Process for the manufacture of artificial filaments, threads, yarns, ribbons, films, fabrics and the like having a reduced, subdued or modified lustre and containing an organic derivative of cellulose, which comprises forming in the materials diacetyl benzidine.

3. Process for the manufacture of artificial filaments, threads, yarns, ribbons, films, fabrics and the like having a reduced, subdued or modified lustre and containing an organic derivative of cellulose, which comprises forming in the materials dibenzoyl benzidine.

4. Process for the manufacture of artificial filaments, threads, yarns, ribbons, films, fabrics and the like having a reduced, subdued or modified lustre and containing an organic derivative of cellulose, which comprises forming in the materials diacetyl tolidine.

5. Process for the manufacture of artificial filaments, threads, yarns, ribbons, films and the like having a reduced, subdued or modified lustre due to the presence therein of an acidyl derivative of a diamino diphenyl base which has a melting point of at least about 200° C., which comprises forming the materials from a solution containing an organic derivative of cellulose and one component of the said acidyl derivative and thereafter treating the materials with a reagent to form the said derivative.

6. Process for the manufacture of artificial filaments, threads, yarns, ribbons, films and the like having a reduced, subdued or modified lustre due to the presence therein of diacetyl benzidine, which comprises forming the materials from a solution containing an organic derivative of cellulose and one component of diacetyl benzidine and thereafter treating the materials with a reagent to form diacetyl benzidine.

7. Process for the manufacture of artificial filaments, threads, yarns, ribbons, films and the like having a reduced, subdued or modified lustre due to the presence therein of dibenzoyl benzidine, which comprises forming the materials from a solution containing an organic derivative of cellulose and one component of dibenzoyl benzidine and thereafter treating the materials with a reagent to form dibenzoyl benzidine.

8. Process for the manufacture of artificial filaments, threads, yarns, ribbons, films and the like having a reduced, subdued or modified lustre due to the presence therein of diacetyl tolidine, which comprises forming the materials from a solution containing an organic derivative of cellulose and one component of diacetyl tolidine and thereafter treating the materials with a reagent to form diacetyl tolidine.

9. Process for the manufacture of artificial filaments, threads, yarns, ribbons, films, fabrics and the like containing cellulose acetate and having a reduced, subdued or modified lustre due to the presence therein of an acidyl derivative of a diamino diphenyl base which has a melting point of at least about 200° C., which comprises incorporating in the formed materials one component of the said derivative and subsequently treating the materials with a reagent to form the said compound.

10. Process for the manufacture of artificial filaments, threads, yarns, ribbons, films, fabrics and the like containing cellulose acetate and having a reduced, subdued or modified lustre due to the presence therein of diacetyl benzidine, which comprises incorporating in the formed materials one component of diacetyl benzidine and subsequently treating the materials with a reagent to form diacetyl benzidine.

11. Process for the manufacture of artificial filaments, threads, yarns, ribbons, films, fabrics and the like containing cellulose acetate and having a reduced, subdued or modified lustre due to the presence therein of dibenzoyl benzidine, which comprises incorporating in the formed materials one component of dibenzoyl benzidine and subsequently treating the materials with a reagent to form dibenzoyl benzidine.

12. Process for the manufacture of artificial filaments, threads, yarns, ribbons, films, fabrics and the like containing cellulose acetate and having a reduced, subdued or modified lustre due to the presence therein of diacetyl tolidine, which comprises incorporating in the formed materials one component of diacetyl tolidine and subsequently treating the materials with a reagent to form diacetyl tolidine.

13. Process for the manufacture of artificial filaments, threads, yarns, ribbons, films, fabrics and the like containing organic esters of cellulose and having a reduced, subdued or modified lustre due to the presence therein of an acidyl derivative of a diamino diphenyl base which has a melting point of at least about 200° C., which comprises incorporating in the formed materials a diamino diphenyl base and subsequently treating the materials with an acidylating agent to form said acidyl derivative.

14. Process of the manufacture of artificial filaments, threads, yarns, ribbons, films, fabrics and the like containing cellulose acetate and having a reduced, subdued or modified lustre due to the presence therein of an acidyl derivative of a diamino diphenyl base which has a melting point of at least about 200° C., which comprises incorporating in the formed materials a diamino diphenyl base and subsequently treating the materials with an acidylating agent to form said acidyl derivative.

HENRY DREYFUS.